United States Patent [19]

Zappia

[11] 4,062,668
[45] Dec. 13, 1977

[54] APPARATUS FOR ARC MOVEMENT OF THE PARISON

[75] Inventor: Anthony T. Zappia, Carmel, Ind.

[73] Assignee: Ball Packaging Products, Inc., Muncie, Ind.

[21] Appl. No.: 718,406

[22] Filed: Aug. 30, 1976

[51] Int. Cl.$^2$ ............................................. C03B 9/00
[52] U.S. Cl. ..................................... 65/229; 65/80; 65/237; 65/239; 65/241
[58] Field of Search .................. 65/80, 239, 238, 237, 65/241, 79, 229

[56] References Cited

U.S. PATENT DOCUMENTS

| | | | |
|---|---|---|---|
| 810,031 | 1/1906 | Brookfield | 65/237 |
| 854,236 | 5/1907 | Reichel | 65/232 |
| 877,981 | 2/1908 | Beeson | 65/238 X |
| 1,745,794 | 2/1930 | Hatch | 65/229 |
| 1,833,623 | 11/1931 | Smith | 65/241 X |
| 2,011,187 | 8/1935 | Rowe | 65/237 |
| 2,151,876 | 3/1939 | Wadman | 65/230 |
| 2,864,124 | 12/1958 | Strauss | 65/229 X |
| 2,918,756 | 12/1959 | Mumford | 65/232 X |
| 3,216,813 | 11/1965 | Mumford | 65/241 X |
| 4,002,454 | 1/1977 | Rowe | 65/229 |
| 4,004,906 | 1/1977 | Rowe | 65/229 X |
| 4,010,021 | 1/1977 | Foster | 65/229 |

Primary Examiner—S. Leon Bashore
Assistant Examiner—Frank W. Miga
Attorney, Agent, or Firm—Jenkins, Coffey & Hyland

[57] ABSTRACT

Glassware forming apparatus includes a turret mounted for rotation about, and projection along, a vertical axis. First, second, third and fourth arms are rigidly mounted on said turret to extend horizontally and radially outwardly. The first arm supports a first neck ring. The second arm supports a second neck ring. The third arm supports a first blow head. The fourth arm supports a second blow head. The apparatus further includes a parison mold and first and second blow molds. Each of the blow molds is divided into two mold portions joined along a vertical hinge. The axes of the blow mold hinges extend generally parallel to the turret axis. Apparatus is provided for opening and closing the molds, for pivoting the turret about its axis and for projecting the turret along its axis to position the first and second neck rings alternately in engagement with the parison mold, to convey blanks supported from the first and second neck rings to the first and second blow molds, respectively, and to position the first and second blow heads in engagement with blanks conveyed to the first and second blow molds, respectively. The method of the present invention involves moving the arms to form blanks on the neck rings in the parison mold, to deposit the blanks in the blow molds, to engage the blanks in the blow molds with the blow heads and to remove the finished glassware to a removal station.

10 Claims, 7 Drawing Figures

APPARATUS FOR ARC MOVEMENT OF THE PARISON

This invention relates to methods and apparatus for forming glassware.

There are several well known types of apparatus for forming hollow glassware. Among these are apparatus for forming hollow glassware by pressing glassware blanks upright in one or more parison molds, transferring the pressed blanks linearly through one or more successive stages of reheating, transferring the reheated blanks to a blow mold and blowing the blanks therein. The following United States patents are presented as illustrative of several well known methods and apparatus for forming hollow glassware: U.S. Pat. Nos. 3,914,120 issued Oct. 21, 1975, to Foster; 3,329,492 issued July 4, 1967, to Kinsley; 3,434,820 issued Mar. 25, 1969, to Zappia et al; and 3,169,846 issued Feb. 16, 1965, to Zappia.

Reference is here also made to my two co-pending United States patent applications, Ser. No. 718,404 and Ser. No. 718,405, both titled GLASSWARE FORMING APPARATUS AND METHOD, filed of even date herewith and assigned to the same assignee as the present invention.

It is an object of the present invention to provide an apparatus for forming hollow glassware which constitutes an improvement over the prior-art devices.

According to the present invention, the glassware forming apparatus includes at least first and second neck rings and first and second blow heads. First and second arms support the first and second neck rings, respectively, and third and fourth arms support the first and second blow heads, respectively. All four arms are rigidly mounted upon a turret which supports them for projection along a common axis and pivotal movement about the common axis. The apparatus further includes a parison mold and first and second blow molds. Each of the blow molds is divided into two mold portions, the portions being joined at a hinge. Each of the blow mold hinges has an axis which extends generally parallel to the axis of the turret. Means are provided for opening and closing the molds, for pivoting the turret about its axis and for projecting the turret along the axis to position the first and second neck rings alternately in engagement with the parison mold, to convey blanks supported from the first and second neck rings to the first and second blow molds, respectively, and to position the first and second blow heads in engagement with blanks conveyed to the first and second blow molds, respectively, to form glassware therefrom.

In a preferred embodiment of the invention, each of the first and second blow heads includes a pair of takeout jaws for removing finished glassware from the first and second blow molds, and for depositing the finished glassware at a finished glassware position. Further, according to the preferred embodiment, the three molds and the finished glassware position are spaced 90° apart about the periphery of a circle, the center of which coincides with the turret axis. The turret is horizontally pivotal to move the arms through arcs of approximately 90° in two opposite directions, the three molds and the finished glassware position being substantially equally spaced about the periphery of the circle. The angular spacing between adjacent arms is 90°.

Further, according to the present invention, the means for pivoting the turret about its axis comprises a shaft extending along the turret axis and having first and second ends. The turret is mounted on the first end and a pinion gear is mounted on the second end. First and second racks are provided for alternately engaging the pinion gear. The racks are supported from a frame for selective shifting movement. The frame itself is supported for movement longitudinally and controllably moving the frame support means and for controllably shifting the frame selectively to engage the pinion gear with one of the first and second racks.

In a preferred embodiment of the invention, the frame is pivotally mounted on the frame support means and has a first position in which the first rack engages the pinion gear and a second position in which the second rack engages the pinion gear. The means for controllably shifting the frame comprises a piston-and-cylinder arrangement actuable to pivot the frame upon the frame support means between a first position in which the first rack engages the pinion gear and a second position in which the second rack engages the pinion gear. The means for longitudinally and controllably shifting the frame comprises a piston-and-cylinder arrangement linearly actuable in a first direction to rotate the pinion gear in a first direction in engagement with the first rack and linearly actuable in a second and opposite direction to rotate the pinion in a first direction in engagement with the second rack.

Further, according to the present invention, a method of forming hollow glassware includes the steps of depositing a gob of molten glass through a first neck ring supported by a first arm into a parison mold, pressing the glass to a first glassware blank suspended from the first neck ring and pivoting the first arm about the turret axis to move the first blank into a position in registry with the first blow mold. At the same time, a second arm supporting a second neck ring is pivoted about the axis to a position in registry with the parison mold. A gob of molten glass is deposited through the second neck ring into the parison mold, and the glass is pressed to a second blank suspended from the second neck ring. The first blow mold is closed to suspend the first blank therein, and the first neck ring releases the first blank. The second arm is then pivoted to move the second blank into a position in registry with a second blow mold. A third arm supporting a first blow head pivots at the same time about the turret axis to a position in registry with the first blow mold. The first blow head engages the first blank, and a first piece of hollow glassware is blown from the first blank. The third arm is pivoted to move the first piece of glassware from the first blow mold to a finished glassware position, and the first piece of glassware is deposited at that position. The second blow mold is closed to suspend the second blank therefrom and the second blank is released from the second neck ring. The fourth arm is pivoted to move a second blow head into registry with the second blow mold. The second blow head engages the second blank and blows a second article of glassware therefrom. The fourth arm is then pivoted to move the second article of glassware from the second blow mold to the finished glassware position, where the second article of glassware is deposited.

The invention may best be understood by reference to the following description of a preferred embodiment of the invention and the accompanying drawings which illustrate the invention. In the drawings.

In the illustrated embodiment of the invention, a parison mold 20, a first blow mold 24 and a second blow mold 28 are arranged about a column 30. Parison mold 20 includes two vertically extending halves 34, 36 joined at a hinge 40 having an axis which extends parallel to the axis of column 30.

Blow mold 24 includes two vertically extending halves 44, 46 which are joined by a hinge 50. The axis of hinge 50 extends parallel to the axis of column 30. The second blow mold 28 includes two vertically extending halves 54, 56 which are joined at a hinge 60. The axis of hinge 60 also extends parallel to the axis of column 30.

Four arms 112, 114, 116, 118 project radially from a turret 120 which is mounted at the top of column 30.

Arm 112 includes two neck rings 122, 124 having openings 126, 128, respectively, therethrough. Arm 114 has two neck rings 130, 132 which contain center openings 134, 136, respectively. Arm 116 includes two blow heads 140, 142 which include pairs of take-out jaws 144, 146, respectively. Arm 118 includes two blow heads 150, 152 which have pairs of take-out jaws 154, 156, respectively.

Figure 1:
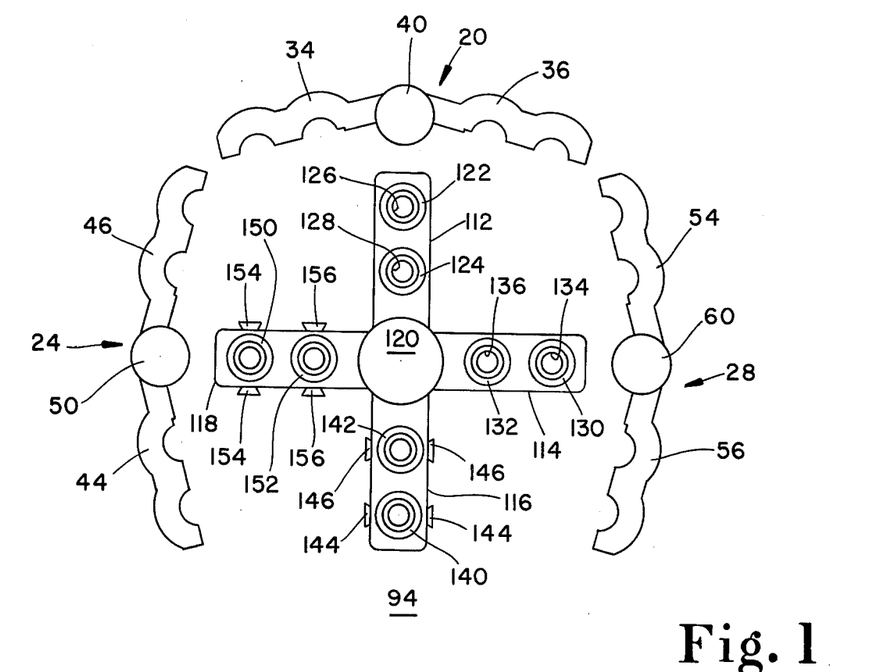
FIG. 1 is a somewhat diagrammatical top plan view of the apparatus of the present invention at an initial position.
Figure 2:
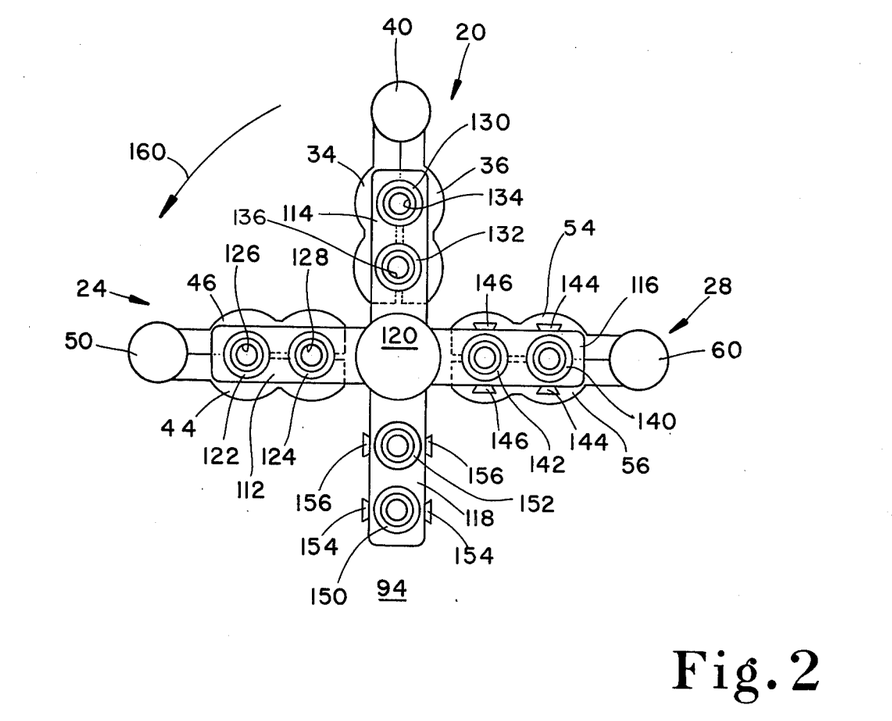
FIG. 2 is a top plan view of the apparatus of FIG. 1 in a second position.

In its starting position illustrated in FIG. 1, the apparatus is at rest with neck rings 122, 124 overlying parison mold 20. Parison mold 20 is closed. Two gobs of molten glass are dropped through openings 126, 128. These gobs are then pressed into blanks through openings 126, 128 in mold 20 by a pressing apparatus (not shown) which overlies mold 20. Turret 120 then projects vertically upwardly a slight distance along the axis of column 30 and pivots 90° in the direction of arrow 160 of FIG. 2. Turret 120 then projects slightly downwardly so that the freshly pressed blanks suspended from neck rings 122, 124 are in position for engagement in blow mold 24. At the same time, turret 120 moves neck rings 130, 132 into registry with parison mold 20. Mold 24 closes about the two freshly pressed blanks in neck rings 122, 124 and these blanks begin to reheat in mold 24. At the same time, parison mold 20 closes and two more fresh gobs of glass are dropped through openings 134, 136 in neck rings 130, 132. Two more blanks are pressed through openings 134, 136 from the two freshly deposited gobs.

Neck rings 122, 124 release their blanks leaving them suspended in blow mold 24. Parison mold 20 and blow mold 28 open upon their hinges 40, 60, respectively. Turret 120 is projected slightly upwardly and rotated 90° in the direction of arrow 164 in FIG. 3. Turret 120 then projects downwardly.

Figure 3:
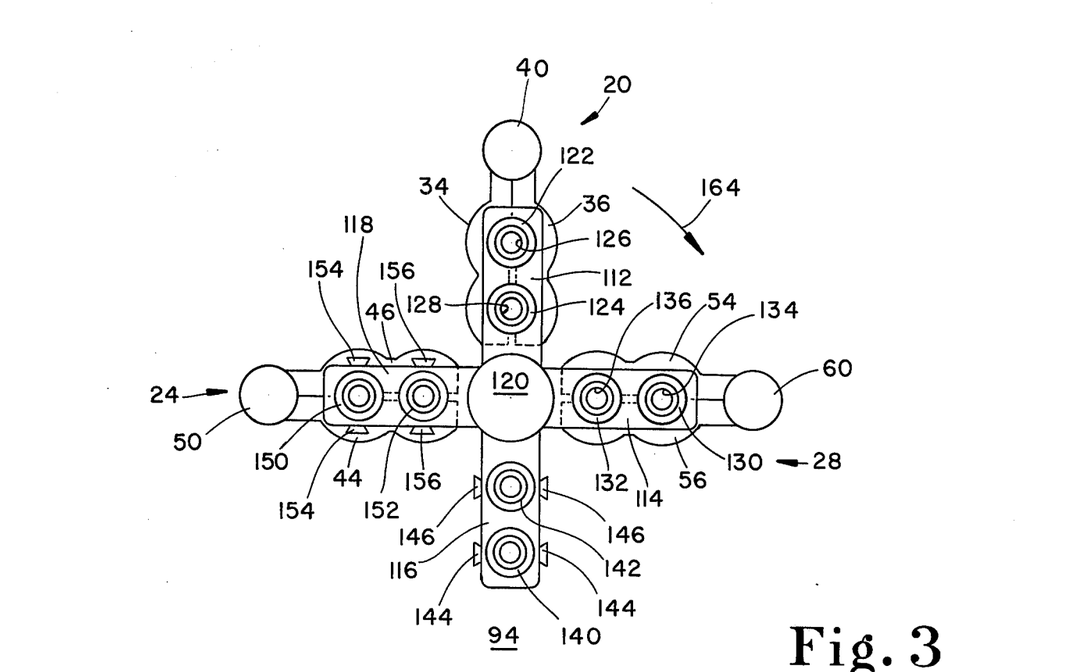
FIG. 3 is a top plan view of the apparatus of FIGS. 1-2 in a third position.

Two freshly pressed blanks are thus conveyed into registry with blow mold 28. Neck rings 122, 124 overlie parison mold 20. Blow heads 150, 152 overlie the reheating blanks in blow mold 24. Molds 20, 28 close. Mold 28 now supports the two freshly pressed blanks which begin reheating. Neck rings 130, 132 release these blanks. At the same time, blow heads 150, 152 engage the necks of the two reheated blanks in blow mold 24. Blow heads 150, 152 are energized from a source of compressed air (not shown), and two bottles are blown from the reheated blanks in blow mold 24. Also at this time, two fresh gobs are deposited in parison mold 20 through openings 126, 128 and two more blanks are pressed through these openings. The supply of compressed air to blow heads 150, 152 is interrupted after bottles have been blown in blow mold 24. Interruption of the air supply causes take-out jaws 154, 156 of blow heads 150, 152, respectively, to engage the freshly blown bottles in blow mold 24.

Figure 4:
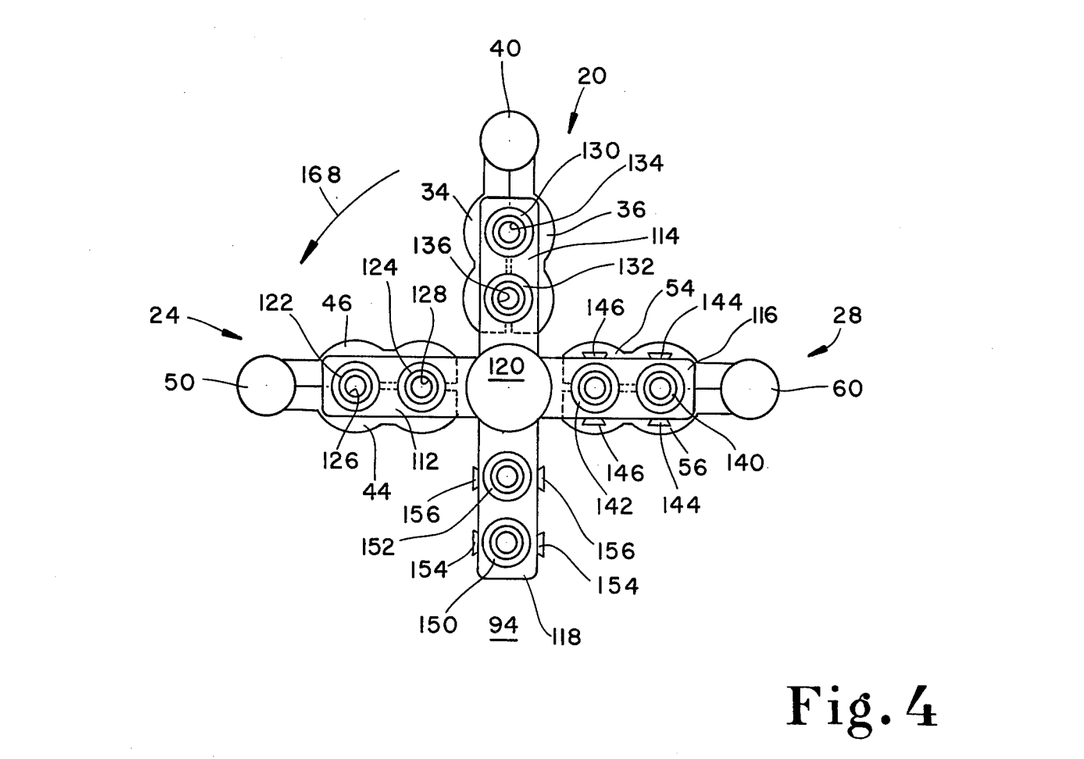
FIG. 4 is a top plan view of the apparatus of FIGS. 1-3 at a fourth position.
Figure 5:
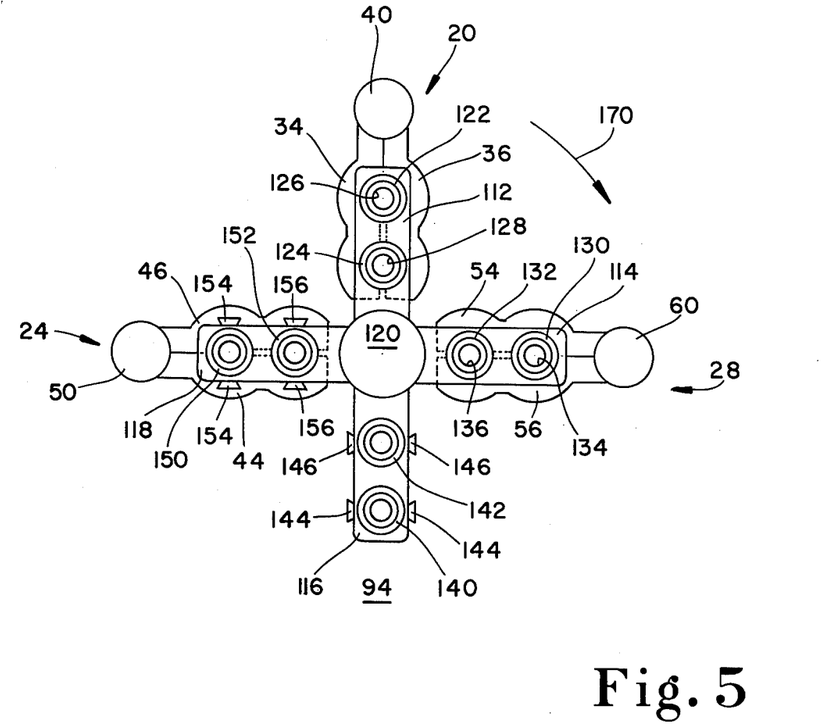
FIG. 5 is a top plan view of the apparatus of FIGS. 1-4 at a fifth position.

Molds 20, 24 and 28 then open. Turret 120 projects vertically slightly upwardly and pivots 90° in the direction of arrow 168 of FIG. 4. Turret 120 is then projected slightly downwardly. Molds 20, 24, 28 are all closed, and the air supply to blow heads 150, 152 is resumed, causing take-out jaws 154, 156 to release two freshly blown bottles at dead plate 94. Blow heads 140, 142 engage the reheated blanks in blow mold 28, and the supply of air to blow heads 140, 142 is energized. The blanks in blow mold 28 are blown into bottles. The two freshly pressed blanks carried by neck rings 122, 124 are engaged in and supported by blow mold 24. Neck rings 122, 124 release the blanks and the blanks begin to reheat in mold 24. Two fresh gobs of glass are deposited through openings 134, 136 in neck rings 130, 132, respectively, into parison mold 20. These gobs are pressed through openings 134, 136 by the pressing apparatus.

Molds 20, 24, 28 then open and turret 120 is projected slightly upwardly. Arm 116 carries with it two freshly blown bottles. Arm 114 carries with it two freshly pressed blanks. The turret is pivoted through 90° in the direction of arrow 170 in FIG. 5. The turret is projected slightly downwardly. The supply of air to blow heads 140, 142 is then interrupted, causing take-out jaws 144, 146, respectively, to deposit the freshly blown bottles on dead plate 94. At the same time, blow heads 150, 152 engage the reheated blanks in blown mold 24 and air is supplied to blow heads 150, 152 to begin blowing bottles from these blanks. The two freshly pressed blanks suspended from neck rings 130, 132 of arm 114 are suspended in blow mold 28. Neck rings 130, 132 release these blanks. Two fresh gobs of glass are deposited through openings 126, 128 in neck rings 122, 124 into parison mold 34. The glassware forming apparatus of FIGS. 1-5 is then ready to begin its next operating cycle.

Figure 6:
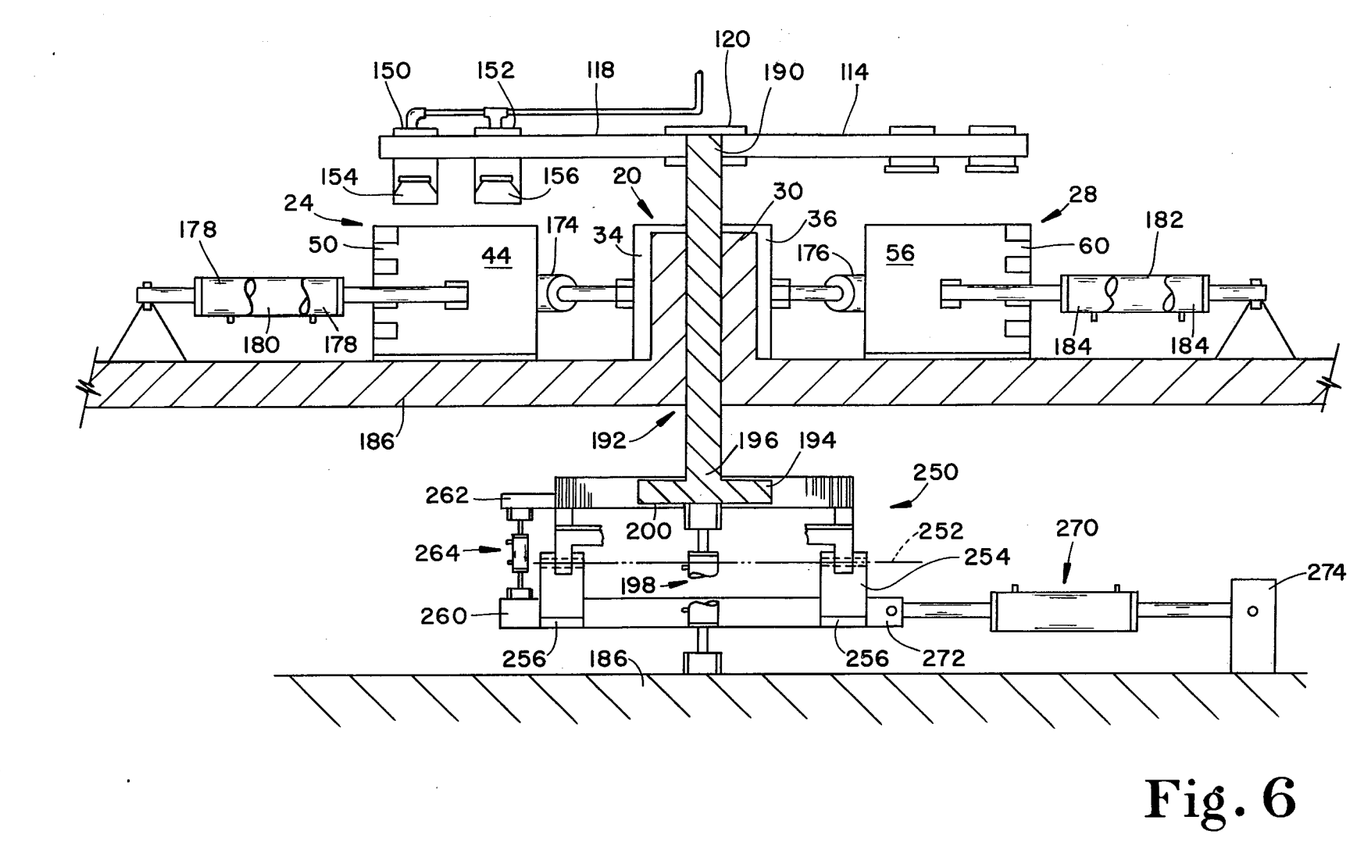
FIG. 6 is a fragmentary sectional side elevational view of an apparatus for pivoting and projecting the turret along the supporting column axis.
Figure 7:
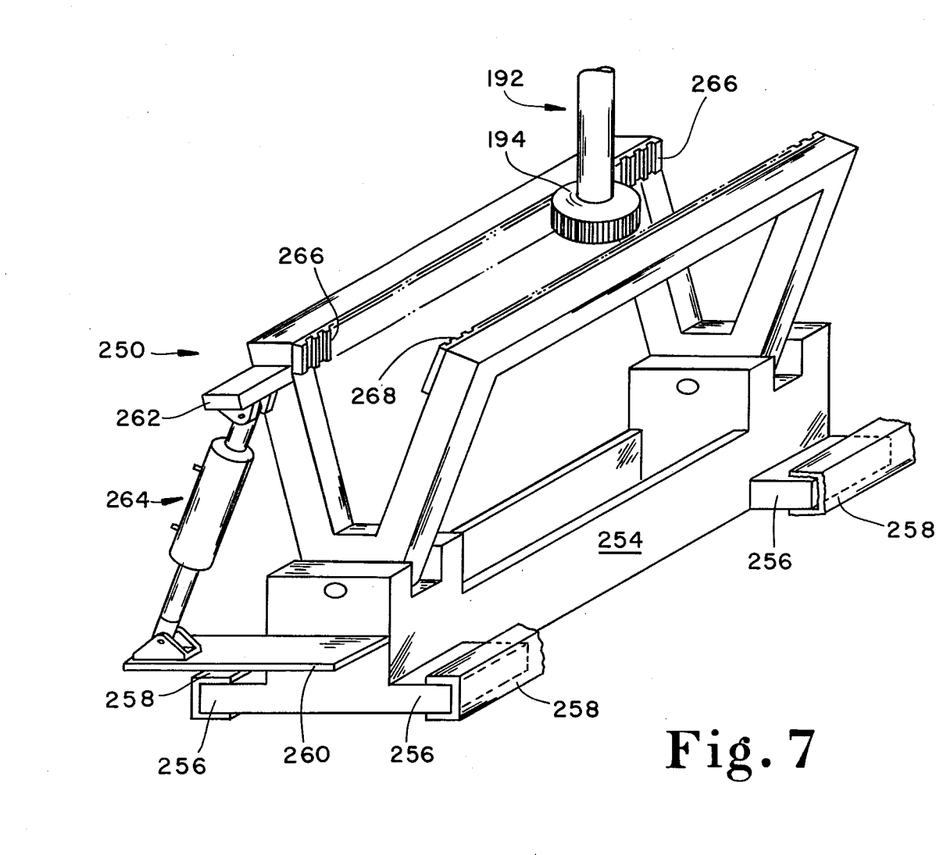
FIG. 7 is a fragmentary perspective view of the apparatus of FIG. 6.

FIGS. 6 and 7 illustrate an apparatus for pivoting turret 120 about the axis of column 30 and for projecting the turret and the arms 112-118 which it supports vertically along the column axis. FIG. 6 also illustrates apparatus for opening and closing molds 34, 46, 78.

The apparatus for opening and closing the molds comprises a plurality of two-way piston-and-cylinder arrangements, e.g., pneumatic or hydraulic pistons and cylinders, 174, 176, 178, 180, 182 and 184. A first stationary end of each of devices 174-184 is attached to the top of the table 186. Table 186 supports column 30 and molds 20, 24 and 28. The other movable ends of devices 174-184 are attached respectively to mold halves 34, 36, 44, 46, 54, 56. Actuation of devices 174-184 in a first direction opens molds 20, 24, 28. Actuation of devices 174–184 in the opposite direction closes the molds. Devices 174–184 can be individually or jointly actuable.

In the apparatus for pivoting and projecting turret 120, the turret is securely mounted on the upper end 190 of a shaft 192. Shaft 192 is supported for axial rotation and projection in column 30. A pinion gear 194 is attached to the lower end 196 of shaft 192.

A two-way piston-and-cylinder arrangement 198, e.g., a pneumatic hydraulic piston and cylinder, is attached to the downwardly facing surface 200 of pinion gear 194. The other end of device 198 is attached to table 186 to remain stationary with respect thereto. Actuation of device 198 in a first direction projects shaft 192, turret 120 and arms 112–118 vertically upwardly along the axis of column 30. Actuation of device 198 in a second and opposite direction projects shaft 192, turret 120 and arms 112–118 vertically downwardly.

The apparatus for pivoting turret 120 about the column 30 axis includes a frame 250. Frame 250 is pivotally mounted about a horizontal axis 252 on a frame support apparatus 254. Frame support apparatus 254 includes four horizontally projecting ears 256 at its four corners. Ears 256 longitudinally slidably engage a pair of channels 258 (see FIG. 7) which are mounted on table 186. Frame support apparatus 254 further includes a bracket 260. Frame 250 includes a bracket 262. A two-way piston-and-cylinder arrangement 264 is connected between brackets 260, 262. Frame 250 supports a pair of racks 266, 268. Racks 266, 268 are alternately and selectively engagable with pinion gear 194 when shaft 192 is projected to its vertically upward extent by device 198.

A two-way piston-and-cylinder arrangement 270 is coupled between a bracket 272 on frame support member 254 and a bracket 274 which is attached to table 186. Actuation of device 27 in a first direction moves frame support member 254 in channels 258 in a first direction (to the left in FIG. 6, and out of the page in FIG. 7). Such movement of frame support member 254 in the first direction when rack 266 engages pinion gear 194 (the position illustrated in FIGS. 6–7) causes turret 120 to pivot counter-clockwise when viewed from about (in a direction of arrow 160 in FIG. 2). Actuation of the device 270 in a second and opposite direction (to the right in FIG. 6 and into the page in FIG. 7) when rack 266 engages pinion gear 194 causes turret 120 to pivot clockwise (in the direction of arrow 164 in FIG. 3). Since all blanks suspended in neck rings 122, 124 will be blown in blow mold 24, and all blanks suspended in neck rings 130, 132 will be blown in blow mold 28, no further motion of turret 120 about its axis, and the axis of shaft 192 and pinion gear 194 is required.

The illustrated molds 20, 24, 28 are of a type which is vertically split into two hinged halves. It is to be understood that the method and apparatus of the present invention are also useful with other types of molds. In some other types of parison molds, for example, the mold bottom is in one piece. Blanks are lifted vertically from the mold bottom after pressing instead of the mold separating into two vertical halves to release the blanks. Another type of parison mold with which the present invention is useful includes a one-piece bottom and a collar or bushing which comprises two vertical halves. The bushing halves are joined and are located intermediate the parison bottom and neck ring during blank pressing. When pressing is completed, the halves split, releasing the blank and allowing the ring to lift the blank upwardly from the parison bottom.

What is claimed is:

1. Glassware forming apparatus comprising at least first and second neck rings for supporting glassware, at least first and second blow heads, first and second arms for supporting the first and second neck rings, respectively, third and fourth arms for supporting the first and second blow heads, respectively, a turret for rigidly supporting the first, second, third and fourth arms for pivotal movement about a common vertical axis, a parison mold and first and second blow molds, means for opening and closing the molds, means providing a rest position, and means for pivoting the turret about its axis first in one direction and then in the opposite direction to position the first and second neck rings alternately in engagement with the parison mold, to convey all blanks supported from the first neck ring to the first blow mold, to convey all blanks supported from the second neck ring to the second blow mold, to move the first blow head between a position in engagement with blanks conveyed to the first blow mold to blow them into glassware, and the rest position, and to move the second blow head between a position in engagement with blanks conveyed to the second blow mold to blow them into glassware, and the rest position.

2. The apparatus of claim 1 wherein the rest position is a position for depositing finished glassware and wherein each of the first and second blow heads comprises take-out means for removing finished glassware from the first and second blow molds, respectively, and for depositing the finished glassware at said finished glassware position.

3. The apparatus of claim 2 wherein the parison and blow molds and the finished glassware position are disposed about the periphery of a circle, the center of which coincides with the turret axis.

4. The apparatus of claim 3 wherein the turret is horizontally pivotal through arcs of approximately 90° in two opposite directions, the three molds and the finished glassware position being disposed at substantially equal intervals of 90° about the periphery of the circle, said arms being rigidly spaced 90° apart on said turret with each of said first and second arms being diametrically opposed to one of said third and fourth arms.

5. The apparatus of claim 1 wherein the interiors of the blow molds face the turret axis when the blow molds are open.

6. The apparatus of claim 1 wherein the means for pivoting the turret about its axis comprises a shaft extending along the turret axis, the shaft having first and second ends, the turret being mounted on the first end and a pinion gear being mounted on the second end, a rack for engaging the pinion gear, means for supporting the rack for movement longitudinally thereof to turn the pinion gear, and means for longitudinally and controllably moving the support means.

7. Glassware forming apparatus comprising first and second neck rings, first and second blow heads, a parison mold, first and second blow molds, means defining a finished glassware location, means for opening and closing the parison mold and the blow molds, a turret, means for supporting the first and second neck rings and first and second blow heads from the turret, and means for movably supporting the turret, the parison mold, the first and second blow molds and the finished glassware location being disposed at approximately 90° intervals about the periphery of a circle with the parison mold substantially diametrically opposite the finished glassware location and the blow molds being substantially diametrically opposite one another, the turret being substantially vertically above the center of the circle, the first and second neck rings being supported from the turret with substantially 90° separation in a plane parallel to the plane of the circle and the first and second blow heads being supported from the turret with substantially 90° separation in a plane parallel to the plane of the circle, and each of the first and second neck rings being disposed substantially diametrically opposite one of the first and second blow heads on the turret.

8. The invention of claim 7 wherein the means for supporting the first and second neck rings comprises first and second arms, respectively, which extend radially outwardly from the turret and the means for supporting the first and second blow heads comprises third and fourth arms, respectively, which extend radially outwardly from the turret, the first and fourth arms extending in opposite directions and the second and third arms extending in opposite directions.

9. The apparatus of claim 7 wherein the means for movably supporting the turret comprises a shaft having an axis of rotation extending through the center of the circle perpendicular to the plane thereof, the shaft having a first end up which the turret is mounted and a second end upon which a pinion gear is mounted, a rack for engaging the pinion gear, means for supporting the rack for longitudinal movement to turn the pinion gear and means for longitudinally and controllably moving the frame support means.

10. The apparatus of claim 9 wherein the means for movably supporting the turret further comprises means for projecting the turret vertically along the axis of the shaft.

* * * * *

UNITED STATES PATENT OFFICE
CERTIFICATE OF CORRECTION

Patent No. 4,062,668              Dated December 13, 1977

Inventor(s)  Anthony T. Zappia

It is certified that error appears in the above-identified patent and that said Letters Patent are hereby corrected as shown below:

Column 5, line 9, after "pneumatic", insert --or--;

Column 5, line 41, change "about" to --above--;

Column 8, line 7 (Claim 9), change "up" to --upon--.

Signed and Sealed this

Eighteenth Day of April 1978

[SEAL]

Attest:

RUTH C. MASON
Attesting Officer

LUTRELLE F. PARKER
Acting Commissioner of Patents and Trademarks